United States Patent
Cutler et al.

(10) Patent No.: US 11,596,134 B2
(45) Date of Patent: Mar. 7, 2023

(54) MULTI-FUNCTION FISHING TOOL

(71) Applicant: Cutler's Catch, LLC, East Lansing, MI (US)

(72) Inventors: Gage Cutler, East Lansing, MI (US); James Sottovia, Jackson, MI (US)

(73) Assignee: Finman Holdings, LLC, Heston, KS (US)

( * ) Notice: Subject to any disclaimer, the term of this patent is extended or adjusted under 35 U.S.C. 154(b) by 157 days.

(21) Appl. No.: 16/915,202

(22) Filed: Jun. 29, 2020

(65) Prior Publication Data
US 2021/0068381 A1 Mar. 11, 2021

Related U.S. Application Data

(60) Provisional application No. 62/867,961, filed on Jun. 28, 2019.

(51) Int. Cl.
| | |
|---|---|
| *A01K 91/047* | (2006.01) |
| *A01K 97/00* | (2006.01) |
| *B25F 1/00* | (2006.01) |
| *B26B 17/00* | (2006.01) |

(52) U.S. Cl.
CPC .............. *A01K 97/00* (2013.01); *B25F 1/00* (2013.01); *B26B 17/00* (2013.01)

(58) Field of Classification Search
CPC ......... A01K 97/06; A01K 91/047; B25F 1/00; B26B 17/00
USPC ................................... 7/106; 294/101, 99.1
See application file for complete search history.

(56) References Cited

U.S. PATENT DOCUMENTS

| | | | | |
|---|---|---|---|---|
| 2,254,738 A | * | 9/1941 | Gamache | B26B 17/00 30/175 |
| 2,904,924 A | * | 9/1959 | Tashiro | A01K 95/00 43/44.89 |
| 3,047,947 A | * | 8/1962 | Spenninger | B26B 17/00 30/186 |
| 3,293,792 A | * | 12/1966 | Bittaker, Jr. | A01K 95/00 43/44.89 |
| 3,487,524 A | * | 1/1970 | Filia | H01R 43/042 72/409.13 |
| 4,080,733 A | * | 3/1978 | Clegg | B25B 7/12 30/237 |
| 4,864,767 A | * | 9/1989 | Drosdak | A01K 91/047 43/43.1 |
| 5,673,487 A | * | 10/1997 | Malagnoux | B26B 17/00 30/179 |
| 6,086,126 A | * | 7/2000 | Krauss | H05K 13/0061 294/104 |
| 6,308,421 B1 | * | 10/2001 | Wang | B26B 17/02 30/178 |
| 6,725,546 B1 | * | 4/2004 | Dallas | B23D 29/002 7/130 |

(Continued)

*Primary Examiner* — Paul T Chin
(74) *Attorney, Agent, or Firm* — Mark L. Maki; Miller Canfield

(57) ABSTRACT

A fishing tool is provided for use in association with the performance of fishing and other similar activities, and more particularly, to a rod-mountable fishing tool exhibiting an integrated aesthetic appearance wherein aesthetic shapes and features also can serve multiple functions associated with tasks typically performed while fishing, such as cutting of lines, nipping of knots, tying of knots, storage of hooks and lines, and other tasks.

20 Claims, 9 Drawing Sheets

(56) References Cited

U.S. PATENT DOCUMENTS 8,342,585 B1 * 1/2013 Cooper .................. B66F 9/187
 74/543

* cited by examiner

MULTI-FUNCTION FISHING TOOL

CROSS REFERENCE TO RELATED APPLICATIONS

This application claims priority to U.S. Provisional App. Ser. No. 62/867,961, filed Jun. 27, 2019, the disclosure of which is incorporated herein by reference in its entirety.

FIELD OF THE INVENTION

The invention relates to a fishing tool for use in association with the performance of fishing and other similar activities, and more particularly, to a rod-mountable fishing tool exhibiting an integrated aesthetic appearance wherein aesthetic shapes and features also can serve multiple functions associated with tasks typically performed while fishing, such as cutting of lines, nipping of knots and other severable materials, tying of knots, storage of hooks and lines and other tasks.

BACKGROUND OF THE INVENTION

For individuals who fish or work as fishing guides, various tools such as knives and scissor like cutters may be used to cut fishing line or nip extra lengths of such fishing line. Often, tying of the knots between the fishing line and a lure is accomplished separate from a cutting tool. Further, for storage of tied hooks when not fishing, various methods of storing the hook are employed such as hooking the hook onto an existing line guide mounted to the rod, a hook keeper mounted on the rod, or in some cases, embedding the hook into existing rod structure such as a cork handle or other similar material. Notably, some these functions are performed by separate tools and some functions by structures found on a fishing rod.

It is an object of the invention to provide an improved fishing tool, which overcomes disadvantages associated with known fishing equipment and accessories.

The invention creates a more efficient way to keep people fishing and reduce the time it takes to re-rig, ultimately getting customers back to what they loved to do, fish. Objects of the invention include creating something that was an extension of and a complement to existing gear, did not interfere with the act of fishing, and that never got left behind. The multi-function fishing tool of the present invention is designed to be a subcompact line management solution taking the place of larger tools such as knifes, scissors, nippers, etc., which are commonly used when re-rigging.

The fishing tool as illustrated in the drawings performs multiple functions while providing an aesthetically pleasing design, wherein the functions include but are not limited to the following features:

SLICE (Like a Knife)—Heavy duty cutting blade makes quick work of monofilament, fluorocarbon, copolymer, and braided fishing lines (120 IB+). The blade preferably is made of stainless steel and is embedded in a main body, preferably by insertion through a bottom slot formed in the main body and fastening in place by a central bore and dowel pin or other fastener. In one construction, the main body may be 3D printed, although it will be understood that the main body may be formed by other manufacturing techniques such as molding.

SNIP (Like a Nipper)—Thumb depressible nipper makes precision cuts a breeze, allows easy removal of tag ends, and makes quick work of knots remaining on eyelets. Conveniently placed thumb dimple improves ergonomics (50 IB+) and allows the upper jaw to flex relative to the lower jaw to snip objects against the forward extending blade end on the blade.

STOW (Like a Hook Keeper)—Utilize the enlarged and inline hook keeper formed as an hourglass opening in the tail end of the fishing tool. Designed to remedy the awkward and slow gear storage experience found with traditional (or non-existent) hook keepers.

LINE DYNAMIC—Design Concept utilized to make the fishing tool essentially snagless as well as low profile and convenient—remaining incredibly user intuitive. Compact, low profile, and practically weightless VERSA-MOUNT—Attach anywhere, go anywhere. The fishing tool is designed to seamlessly integrate as a line management tool with a fisherman's most integral pieces of gear all using the included O-rings for attachment:

1. Securely mount to your rod blank (in front of reel or behind reel on split grips)
2. Zippers of clothing and tackle bags
3. Zingers
4. Lanyards
5. Keychains, etc.

EASY GLIDE ENTRY POINT—Seamless line entry point only allows line inside the jaws intentionally—works like a weedless lure to prevent snags and unintentional cuts KNOT POP—Precisely shaped fish head allows user to split knots apart that may be remaining on eyelets.

KNOT ASSIST—Use the fishing tool's eye to stabilize hooks and keep both hands free when tying knots. In addition, the eye provides a safer and more effective way to hold your lure when firmly pulling down knots.

RAZORCUT BLADE—Stainless steel coated blades ensure a razor sharp edge lasting thousands of cuts QUAD-LOCK ATTACHMENT—Attachment is made easy and secure with the Quad-Lock technology—Four point attachment system works in conjunction with a concave base to eliminate lateral torsion on rod blank. Also featuring low profile attachment points to eliminate snags.

XTRA-TOUCH O-RINGS—6 total O-rings are included in pairs of small, medium, and large to accommodate nearly all rod diameters and are nearly indestructible—guaranteed to hold up to the harshest weather extremes. This attachment method is non marring and rock solid.

NEXT-GEN CONSTRUCTION—Advanced polymer body blends strength, durability, and flexibility into one incredibly lightweight material. Intentionally designed to be "non-mechanical" (no hinges, springs, etc.) to increase longevity. Does not become cold to touch and is engineered to withstand repeated exposure to harsh environmental conditions.

Other objects and purposes of the invention, and variations thereof, will be apparent upon reading the following specification and inspecting the accompanying drawings.

BRIEF DESCRIPTION OF THE DRAWINGS

The invention relates to a multi-function fishing tool, of which the following is a Specification, reference being had to the accompanying drawings forming a part hereof.

Figure 1:
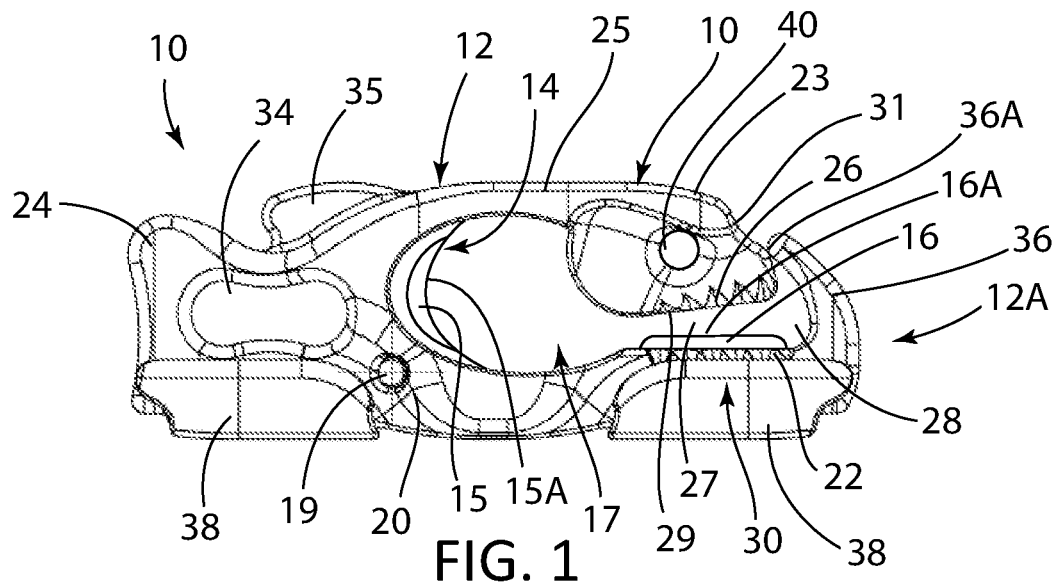
FIG. 1 is a front view of the present invention showing the fishing tool of the invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIGS. 1-8, a multi-function fishing tool 10 of the present invention is designed as a subcompact line management solution taking the place of larger or separate tools such as knives, scissors, nippers, etc. commonly used when re-rigging fishing gear. The fishing tool 10 as illustrated in the drawings performs multiple functions while providing an aesthetically pleasing design.

Generally, the fishing tool 10 includes a main body 12 that is preferably shaped in the general aesthetic appearance of a fish. The main body 12 is configured with various features that not only contribute to the aesthetic appearance but also are configured to perform multiple different functions or tasks that are typically performed when the user is fishing. Preferably, the main body is formed of an advanced polymer body that blends strength, durability, and flexibility into one lightweight material. The main body 12 is designed to be "non-mechanical" (no hinges, springs, etc.) to increase longevity, and does not become cold to touch and is engineered to withstand repeated exposure to harsh environmental conditions.

The fishing tool 10 includes at least one blade 14 wherein a single blade preferably is provided which performs multiple functions. In particular, the blade 14 includes a first portion that forms a cutter blade 15 and a second portion that forms a nipper blade 16. While the blade 14 is configured as a unitary single piece, it will be understood that these cutting and nipping functions may be formed by separate blades.

As one function, the cutter blade 15 is configured to slice like a knife, wherein the cutting edge 15A may be arcuate and face generally forwardly into a hollow body cavity 17. The heavy duty cutting blade 15 quickly cuts many fishing line materials and constructions such as monofilament, fluorocarbon, copolymer, and braided fishing lines (120 lB+). The blade 14 preferably is a metal blade made of or comprising stainless steel and is embedded in the main body 12, preferably by insertion through a bottom slot 18 (see FIGS. 4, 7 and 8) formed in the main body 12. The blade 14 is fastened or pinned in place by a dowel pin or other fastener 19 that is inserted into a central bore 20 formed in the main body 12. While the blade 14 is formed separate from the main body 12, it will be understood by the skilled artisan that the cutting and nipping functions could be incorporated integrally into the main body 12.

Figure 2:
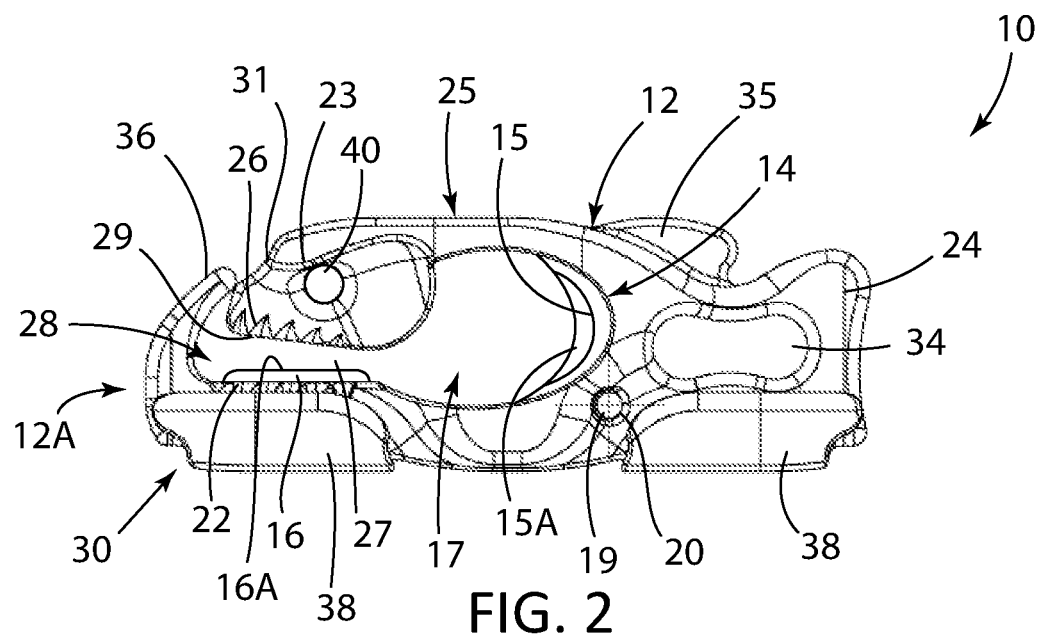
FIG. 2 is a rear view thereof.
Figure 3:
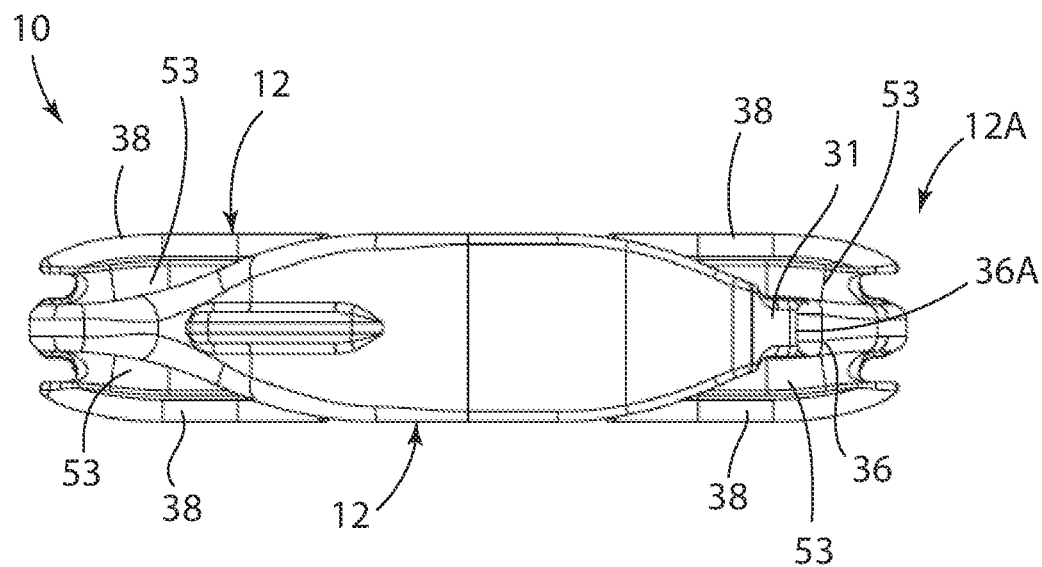
FIG. 3 is a top view thereof.
Figure 4:
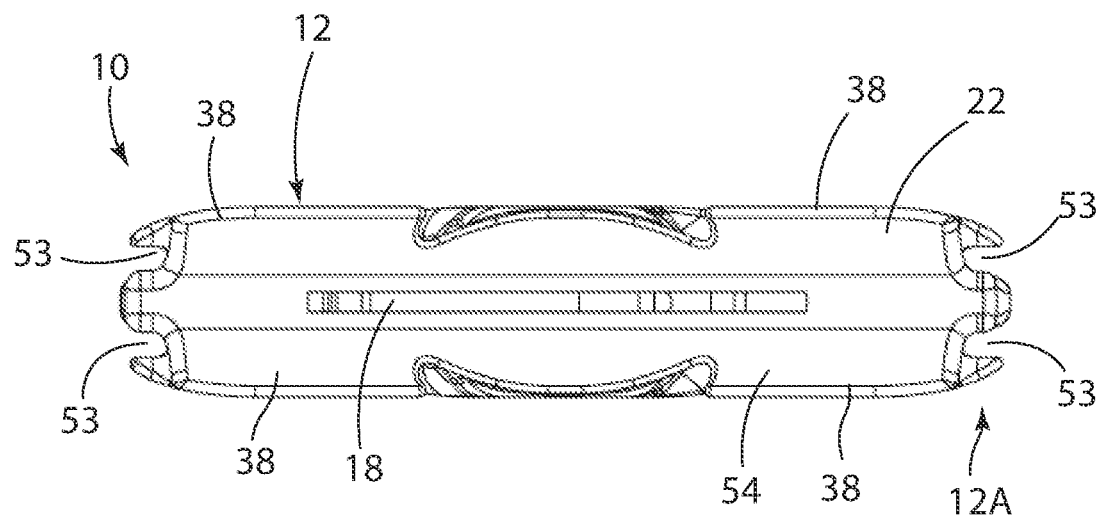
FIG. 4 is a bottom view thereof.
Figure 5:
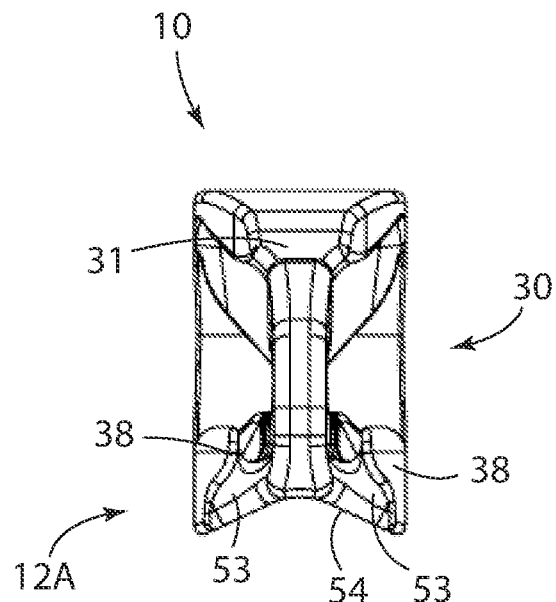
FIG. 5 is a right side elevational view.
Figure 6:
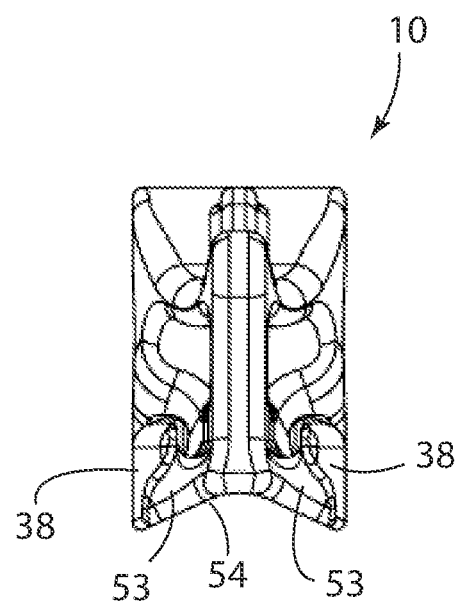
FIG. 6 is a left side elevational view.

As a further function, the nipper blade 16 is configured to snip like a nipper. In more detail, the nose 12A of the main body 12 includes lower jaw 22 from which the nipper blade 16 projects vertically, and a depressible head section 23, which is flexibly joined to a tail section 24 of the main body 12 by a flexible backbone 25. The head section 23 defines an upper jaw 26, which normally is spaced vertically from the lower jaw 22 and the nipper blade 16, to define a horizontally elongate throat 27 that opens rearwardly into the hollow body cavity 17 and forwardly to define a mouth 28 of the head section 23. All of the mouth 28, throat 27 and body cavity 17 open sidewardly through both of the opposite sides of the main body 12 so that fishing line or the like can extend sidewardly or transversely through the thickness of the main body 12. Basically, the upper jaw 26 includes a flat cutting face 29 that faces dowardly toward the cutting edge 16A of the nipper blade 16, such that the cutting face 29 and nipper blade 16 are normally spaced apart as shown in FIGS. 1 and 2. However, the head section 23 can be manually pressed downwardly such as when a user grips the head section 23 and presses with one part of a hand downwardly on the head section 23 and presses upwardly on the lower jaw 22 with another part of the hand. As such, manual squeezing of the head section 23 in this manner displaces the upper jaw 26 downwardly into contact with the nipper blade 16. Any object such as fishing line 48 (see FIG. 10) will then be nipped or severed similar to the use of scissors. As such, the upper jaw 26 and lower jaw 22 function together to define a nipper 30 in the head section 23.

Figure 7:
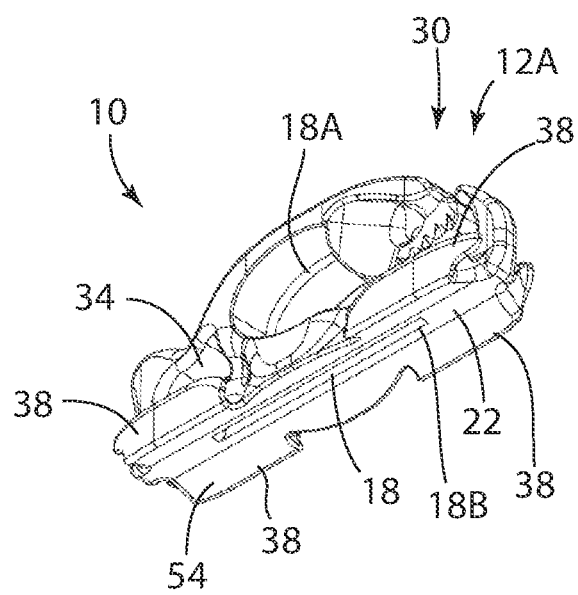
FIG. 7 is a perspective view as taken from the bottom right thereof with the blade omitted for illustrative purposes.
Figure 8:
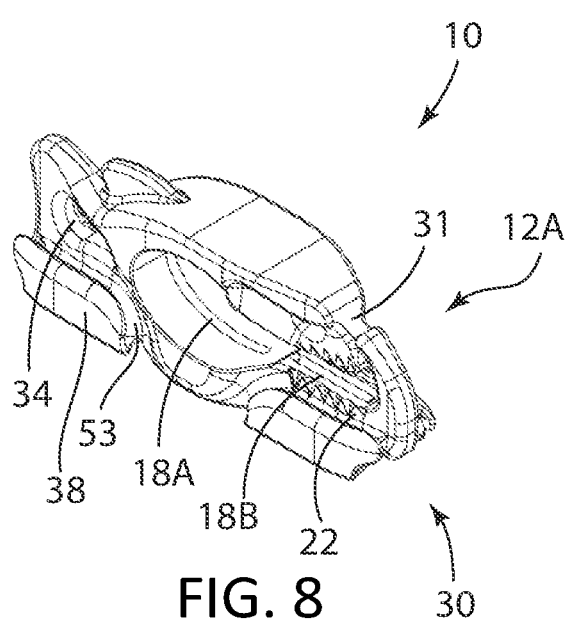
FIG. 8 is a perspective view as taken from the top right thereof with the blade omitted.

The backbone 25 flexes to allow such movement of the upper jaw 26 and effectively defines a living hinge between the head section 23 and tail section 24. As seen in FIGS. 7 and 8, the backbone is relatively wide and spans the width of the main body 12 so as to resist twisting of the head section 23 relative to the tail section during nipping. This helps maintain the upper jaw 26 in alignment with the lower jaw 22 so that the nipper blade 16 is substantially perpendicular with the cutting face 29. Further, the curvature of the backbone 25 allows line to slid past the fishing tool 10 when rod-mounted to resist snagging of fishing line on the fishing tool 10.

While one cutting edge 16A is provided, the upper jaw 26 instead could be provided with its own respective cutting blade. The depressible nipper 30 makes precision cuts, allows easy removal of tag ends 48A (FIG. 16) hanging from a knot 48B after tying, and makes quick work of knots remaining on hook eyelets 55B. A conveniently placed thumb dimple 31 is provided on the upper surface of the head section 23 to improve ergonomics (50 lB+) and allows the upper jaw to flex relative to the lower jaw 22 to snip objects against the nipper blade 16. Therefore, the precisely shaped head section 23 allows a user to split knots apart that may be remaining on fishing hook eyelets 55B. The backbone 25 flexes to allow such movement of the In another function, the fishing tool 10 is configured to stow a tied hook in a manner similar to a hook keeper. In this regard, the tail section 24 may be formed with a storage opening 34, which has an hourglass shape that defines an enlarged and inline hook keeper the tail section 24 of the fishing tool 12. As will be described further herein, the storage opening 34 is designed to remedy the awkward and slow gear storage experience found with traditional (or non-existent) hook keepers. To strengthen the tail section 24, a projecting rib 35 is provided, which has the aesthetic appearance of a fin, and has the structural function of stiffening the tail section 24 in the region of the opening 34. As such, the upper wall of the storage opening 34 might flex or straighten out when pulled on by the fishing line pulling on a stored hook, but the rib 35 helps resist such flexing and strengthen the upper wall of opening 34.

Further, the rib 35 is vertically adjacent and next to the upper wall of the storage opening 34 such that the rib 35 helps stabilize the backbone 25 and resist twisting of the backbone 25 and upper jaw 26 during nipping, which is desirable as described above. In this manner, the rib 35 helps maintain alignment of the nipping blade 16 and cutting face 29.

As a further advantage, the head section 23 further includes an upwardly projecting lip or flange 36 that has a terminal end 36A that contacts the head section 23 proximate the thumb dimple 31. This essentially closes the open front end of the mouth 28 and prevents access to the throat 27 when the head section 23 is in the normal, undepressed condition of FIG. 1. When the head section 23 is flexed downwardly (such as by the user squeezing the head section 23), the mouth 28 is opened and fishing line can be slid into the mouth 28, and then the throat 27 for nipping, and then slid into the body cavity 17 if so desired for cutting by the cutter blade 15. Preferably, the lip 36 is spaced forwardly of the head section 23 and then curves backwardly into contact with the head section 23. This curvature defines an easy glide or seamless entry point that only allows fishing line inside the upper and lower jaws 26 and 22 when intended by the user since the mouth 28 and throat 27 are normally closed and works like a weedless lure to prevent snags and unintentional cuts to the fishing line due to inadvertent entry into the areas of the cutting blade 15 and nipper blade 16. Further, the overall shape of the main body 12 curves generally from the nose section 12A to the backbone 25, which serves to make the fishing tool 10 essentially snagless, as well as low profile and convenient to use.

As noted, the fishing tool 10 is rod-mountable and may be mounted and removed from any fishing rod. The main body 12 is formed with a versa-mount system defined by connector formations that may be formed as a plurality and preferably four connector blocks 38 on the bottom edges of the main body 12. The connector blocks 38 anchor ends 51 of a connector strap such as resilient O-rings 52 and allow the O-rings 52 to wrap about the fishing rod to mount the fishing tool 10 in position. As such, the fishing tool 10 can attach anywhere, go anywhere. For example, the axial position along the length of a rod 50, such as near the handle and in front or back of the reel, and the radial position around the circumference of the rod 50 can be varied as desired by the user.

Further, the fishing tool 10 is configured as a knot assist that helps with the tying of knots. The head section 23 is provided with an opening or eye 40 that opens through the thickness of the main body 12. A user can use the fishing tool's eye 40 to stabilize hooks and keep both hands free when tying knots. In addition, the eye 40 provides a safer and more effective way to hold your lure when firmly pulling down knots.

The fishing tool 10 is designed to seamlessly integrate as a line management tool with an angler's most integral pieces of gear all using included O-rings for attachment. As will described, the fishing tool 10 can securely mount to your rod blank (in front of reel or behind reel on split grips) such as by using the O-rings 52, and also on zippers of clothing and tackle bags, zingers, lanyards, keychains, etc. such as by using connectors looped through the openings 34 or 40.

Figure 9A:
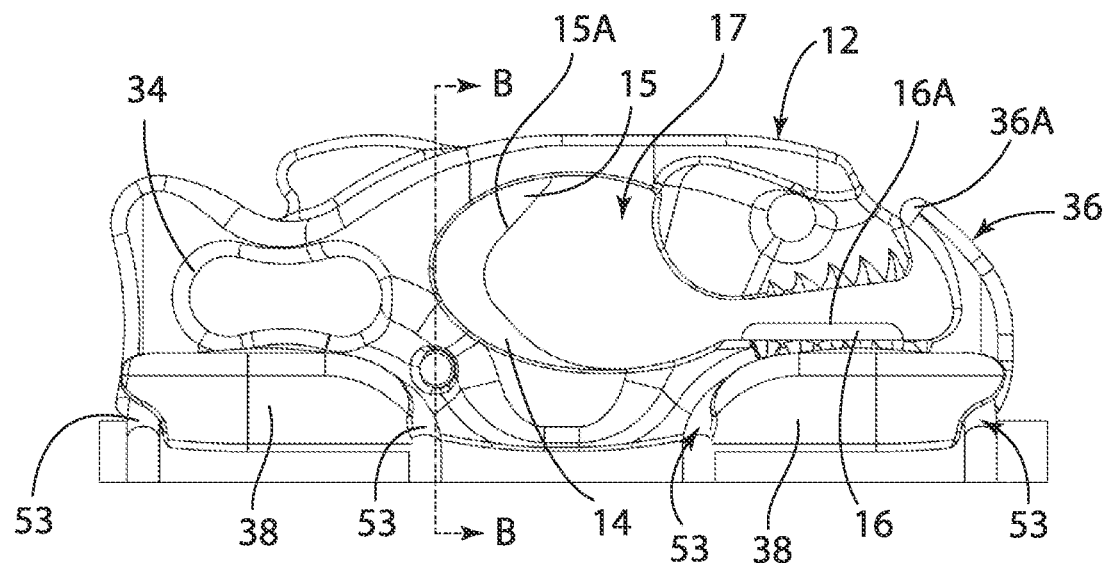
FIG. 9A is an enlarged front view thereof.
Figure 9B:
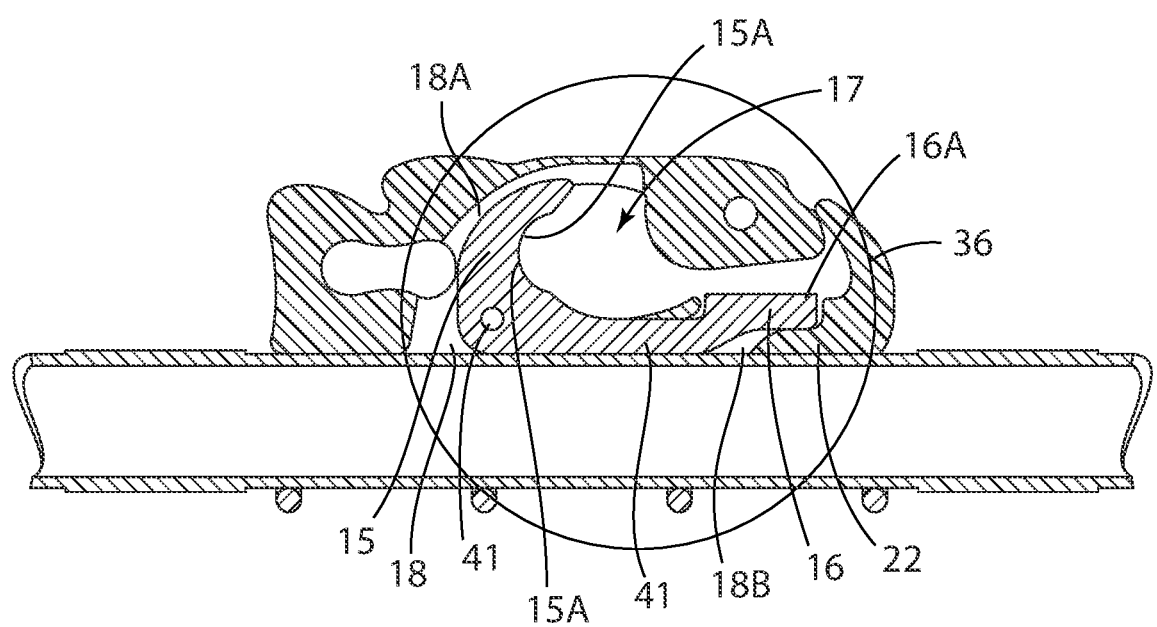
FIG. 9B is a front cross-sectional view of the fishing tool as taken along line A-A of FIG. 9C wherein the fishing tool is shown mounted, for example, on a fishing rod.

As generally described above, the fishing tool 10 allows the user to accomplish multiple different tasks. In more detail, the main body 12 is preferably formed as a integral or single piece that is assembled together with the metal blade 14. Referring to FIGS. 9A and 9B, the main body 12 is preferably formed with the blade slot 18 that allows insertion of the blade 14 into the main body 12 from below and securement therein. It will be understood that the blade and cutting functions might be integrated into the main body 12.

The blade 14 includes the cutter blade 15 and nipper blade 16, which are joined together by an intermediate blade body 41. The slot 18 is accessible through the bottom surface of the main body 12 and has a first slot section 18A that extends into the main body to surround the back portion of the body cavity 17 with the cutting blade 15 projecting outwardly from the first slot section 18A and exposed within the body cavity 17. The slot 18 also has a second slot section 18B that extends forwardly into the lower jaw 22, wherein the nipper blade 16 is exposed.

Figure 9C:
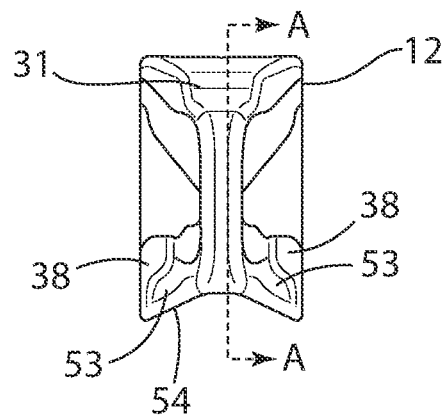
FIG. 9D is an end cross-sectional view as taken along line B-B of FIG. 9A.
Figure 9D:
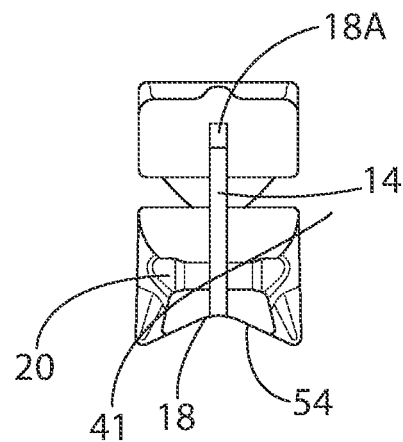

As seen in FIGS. 9C and 9D, the blade 14 essentially is aligned with the centerline of the main body 12 and includes the pin bore 20 for receiving the pin 19. The slot sections 18A and 18B help to limit deformation of the thin blade 14 laterally or sideways within the main body 12. The blade 14 may also include a fastener bore 41 through which the pin 19 is inserted during assembly.

The blade 14 is installed by inserting or nosing the nipper blade 16 into the second slot section 18B and swinging or pivoting the cutter blade 15 upwardly into the first slot section 18A, at which time the blade 14 can be pinned or secured in a fixed position by inserting the pin 19 into the fastener bore 20 such that the pin 19 extends laterally through the blade pin bore 41. Other fastening means may also be used or the blade 14 may be molded into the main body 12, or a blade may be mounted to an exterior of the main body 12 without departing from the present invention.

In more detail, the main body 12 is formed so that the second slot section 18B includes a front shoulder 43 having a front wall 44 and bottom shoulder surface 45. The shoulder surface 45 is configured to lie close to and intermittently support a bottom blade edge 16B during use. The main body 12 also includes a transverse bridge 46 in the slot 18 between the first and second slot sections 18A and 18B. When the blade 14 is installed, the nipper blade 16 is inserted into the second slot section 18B and the pivoted upwardly with the nipper blade 16 pivoting on the front shoulder 43 until the cutter blade 15 moves into and seats within the first slot section 18A. Once seated in position, the pin 19 is installed and the blade 14 is secured in the slot 18.

Once installed, the pin 19 defines a first contact point that in effect is a pivot point for the blade 14 when cutting and nipping. When cutting, the upper blade edge 14A contacts the bottom surface of the bridge 46, which defines a second contact point that in effect is a fulcrum point for the larger cutting blade 15.

Figure 10:
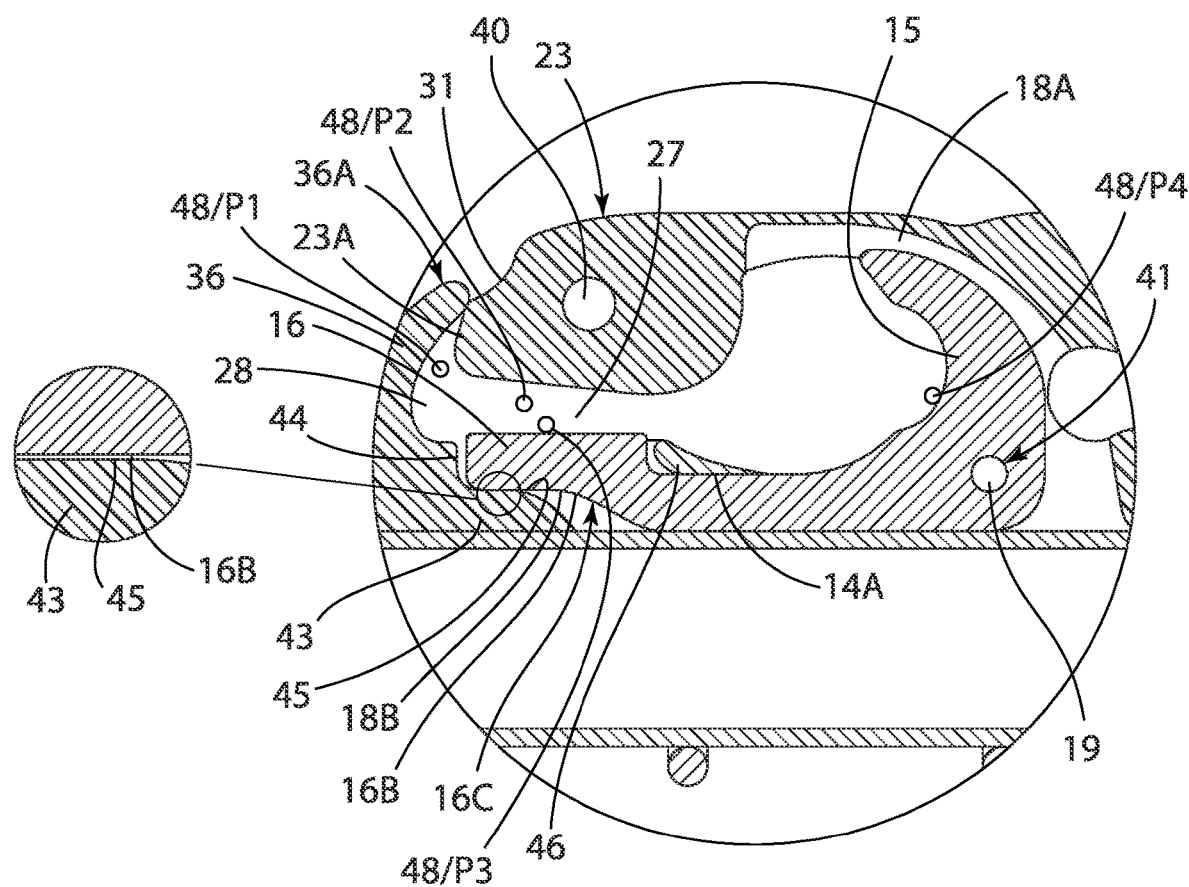
FIG. 10 is an enlarged fragmentary cross-sectional view of the fishing tool of FIG. 9B shown in use on a fishing rod.

When the blade 14 is in the normal installed position, the bottom blade edge 16B is spaced a small distance from the shoulder surface 45 as seen in the detail view of FIG. 10. For nipping, the blade section 16C in effect defines a flex point, wherein the nipper blade 16 can always self-align because of the gap between blade edge 16B and shoulder surface 45. This gives the nipper blade 16 a shear action regardless of where along the edgewise axial length of the nipper blade 16 that line material is being cut when depressing the head section 23.

Figure 11:
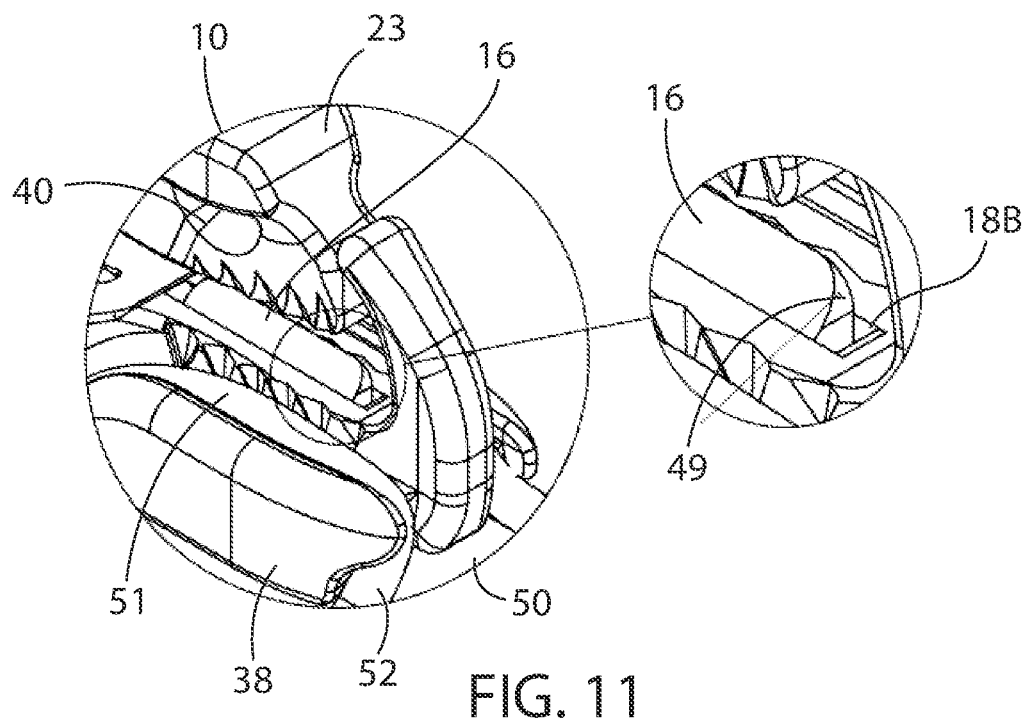
FIG. 11 is a fragmentary perspective view of the nose of the fishing tool as viewed from the right front.

As noted above, the head section 23 has a front-facing surface 23A that contacts the terminal end 36A of the front lip 36 that thereby controls access to the mouth 28, throat 27 and body cavity 17. The terminal end 36A normally contacts the head surface 23A as seen in FIG. 10 and closes access to the mouth 28. When the head section 23 is depressed to open the mouth 28, the fishing line 48 can enter the mouth 28 generally as shown by position P1. The fishing line 48 then moves to position P2 in the throat 27 and may be nipped in position P3 by the nipper blade 16, or be moved to the body cavity 17 for cutting by the cutter blade 15 in position P4. As seen in FIG. 11, the nipper blade 16 preferably has a blade nose 49 formed with a flat radius or curvature that prevents cuts to the fishing line 48 or line abrasion due to movement of the line 48 through the throat 27 which potentially may cause dragging of the fishing line 48 over the blade nose 49.

Figure 12:
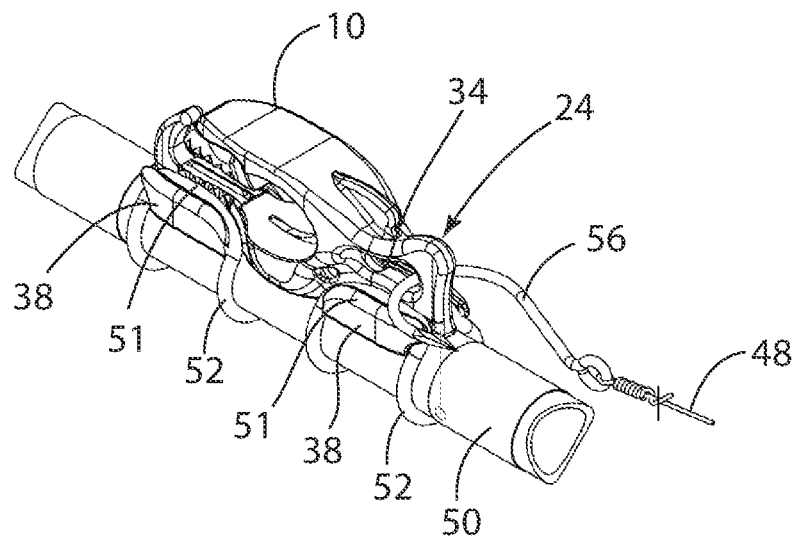
FIG. 12 is a perspective view of the fishing tool in use on a rod and storing the hook such as during storage or transport.

As noted, the fishing tool 10 is removably mountable to a fishing rod 50 as shown in FIG. 12. The main body 12 is formed with connector blocks 38 that project sidewardly and anchor ends 51 of O-rings 52 and allow the O-rings to wrap about the fishing rod to mount the fishing tool 10 in position. This four point attachment system works in conjunction with a concave base surface 54 as seen in FIGS. 9C and 9D to eliminate lateral torsion on rod 50 and maintain the fishing 10 in axial alignment with the rod axis.

Figure 13:
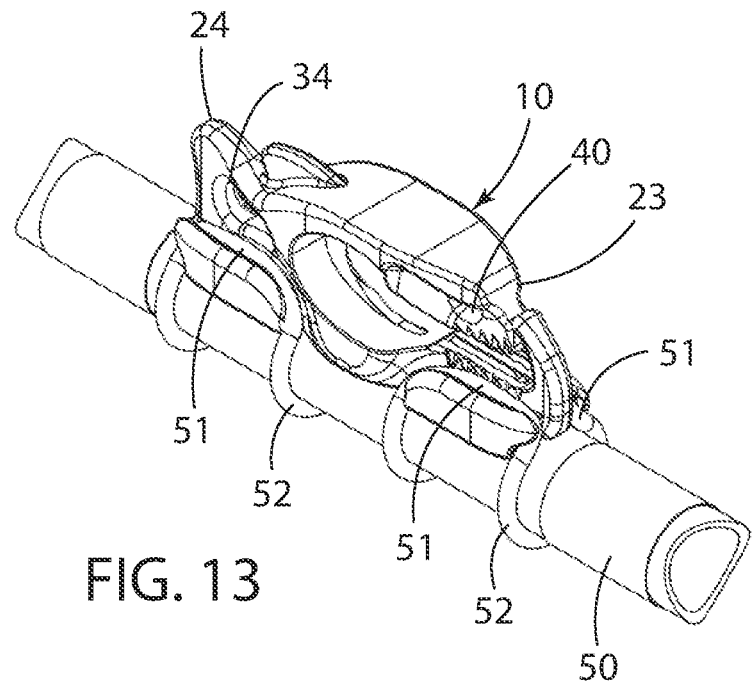
FIG. 13 is a front right perspective view of the fishing tool mounted on the rod.
Figure 14:
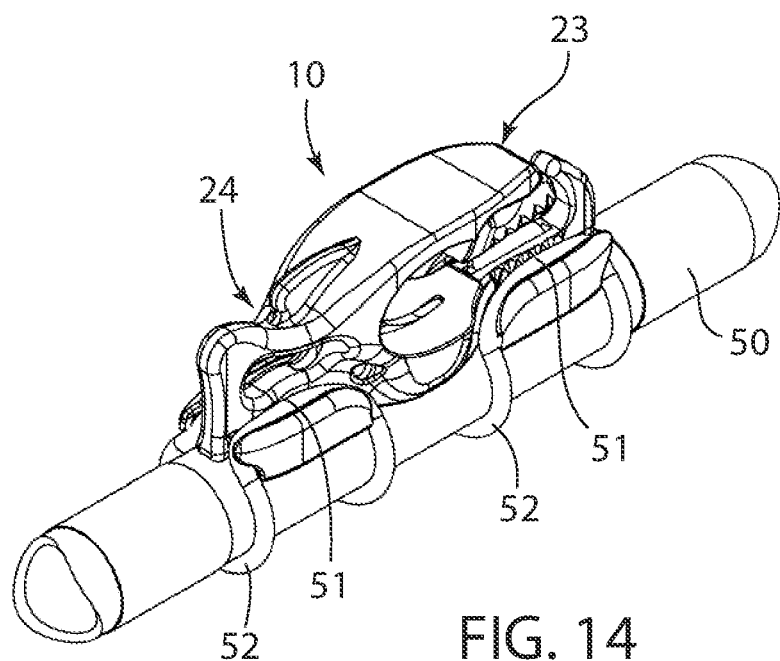
FIG. 14 is a rear left perspective view of the fishing tool mounted on the handle of the fishing rod.

Also the connector blocks 38 define low profile attachment points to eliminate snags. As seen in FIGS. 13 and 14, one end 51 of each O-ring 52 is hooked on one connector block 38 and then the O-ring 52 is stretched around the rod 50 and the other O-ring end 51 is hooked onto the connector block 38 on the opposite side of the main body 12. The connector blocks 38 are provided with smooth, arcuate channels 53 to snugly receive the O-ring ends 52 without cutting or marring the surface thereof. This provides tight fitting attachment of the fishing tool 10 on the rod 50 at virtually any axial position and virtually any radial position about the rod circumference. Preferably, the fishing tool 10 is sold with a kit of six total O-rings 51 of different sizes, which may be included in pairs of small, medium, and large to accommodate nearly all rod diameters, wherein the O-rings 52 and are nearly indestructible and hold up to the harshest weather extremes. This attachment method is non marring.

Figure 15:
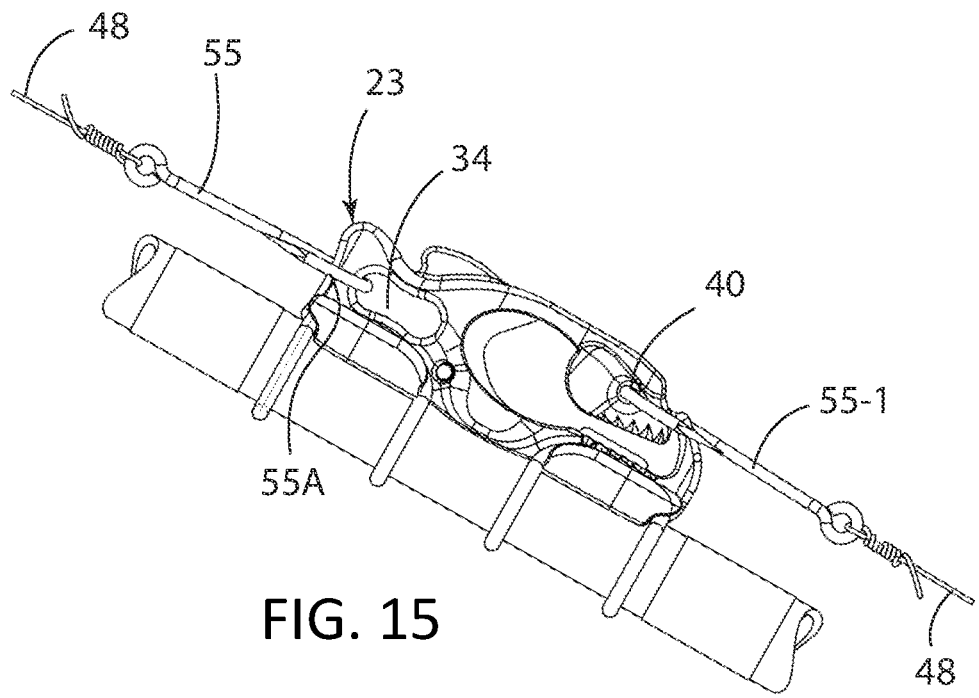
FIG. 15 is a side view of the rod-mounted fishing tool showing use of the tool for hook storage and tying of the hook.
Figure 16:
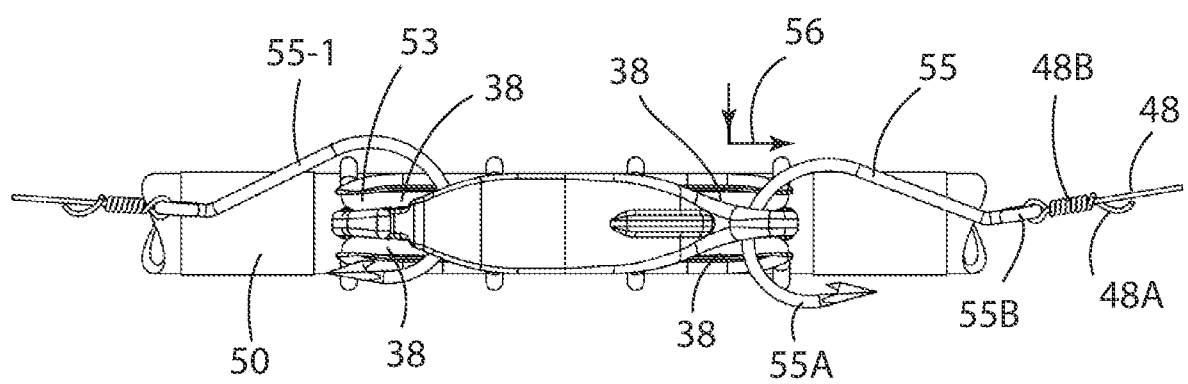
FIG. 16 is a top view of the fishing tool of FIG. 15.

As noted, the tail end 24 includes the opening or aperture 34 for receiving a hook 55 already tied onto the fishing line 48. The end wall of the opening 34 serves as a storage formation that essentially defines a hook keeper. This aperture 34 is hourglass shaped and has a relatively large length corresponding to the length of a hooked portion 55A so that the hooked portion 55A can be inserted sidewardly into the aperture 34 and then pulled axially under line tension to the stored position of FIGS. 15 and 16. This hook movement is generally identified by reference arrow 56 (FIG. 16). As such, the aperture 34 and end wall function as a line keeper for tied hooks 55. If there is substantial line tension, the upper wall of the opening 34 might tend to flex, but the upper wall is strengthened and rigidified by the adjacent fin-shaped rib 35.

However, it may be necessary to tie the fishing line 48 to an untied hook 55-1. The aperture 34, however, is relatively large and the untied hook 55-1 would tend to easily fall out in the absence of line tension, such that the aperture 34 does not provide much benefit or assistance in the tying of fishing line 48. However, the eye 40 is provided, which is relatively small and requires that the untied hook 55-1 be manipulated into the eye 40. This then helps hold the hook 55-1 on the fishing tool 10 and then the fishing line 48 can be more easily tied onto the hook 55-1 as seen in FIGS. 15 and 16 after tying is completed. The eye 40 serves as a hook anchor that holds the hook during knot tying. Typically, the fishing line 48 is slack during this task and the hook 55-1 can then be readily removed from the eye 40 once tied. Once tying is complete, the line slack is reeled in and the hook keeper 34 can then be used, whereby the hook is now tied and designated as tied hook 55.

The inventive fishing tool 10 is particularly suitable for use in association with the performance of fishing and other similar activities, and more particularly, serves as a rod-mountable fishing tool 10 that is usable mounted or off of a fishing rod 50. The fishing tool 10 exhibits an integrated aesthetic appearance wherein aesthetic shapes and features also can serve multiple functions associated with tasks typically performed while fishing, such as cutting of lines, nipping of knots and other severable materials, tying of knots, storage of hooks and lines and other tasks.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:
1. A fishing tool comprising:
a main body having a cutting blade and a nipping blade; said main body further comprising:
a tail section:
a head section flexibly joined to said tail section;
a lower jaw defined on said main body;
an upper jaw defined on said head section in spaced relation from said lower jaw to define an open throat in which said nipping blade is located for nipping by movement of said head section; and
said throat opening into a mouth into which fishing line may be slid for insertion into said throat, and opening into a body cavity in which said cutting blade is locating for cutting of said fishing line by displacement of said fishing line against said cutting blade.

2. The fishing tool according to claim 1, wherein said cutting blade and said nipping blade are formed as a single blade.

3. The fishing tool according to claim 2, wherein said main body includes a slot and said single blade is fixed in said slot to position said cutting blade in said body cavity and position said nipping blade in said throat.

4. The fishing tool according to claim 1, wherein said main body includes connector formations for removably mounting said fishing tool on a fishing rod.

5. The fishing tool according to claim 4, wherein said connector formations comprise at least one pair of connector blocks that project sidewardly and engage opposite ends of a connector member to secure said fishing tool on a fishing rod.

6. The fishing tool according to claim 5, wherein said connector blocks include respective grooves which receive looped ends of said connector member.

7. The fishing tool according to claim 6, wherein the connector strap is formed as an O-ring and said main body includes connector blocks to secure one or more said O-rings.

8. The fishing tool according to claim 1, wherein said main body includes an eye configured to support a hook without manual support.

9. The fishing tool according to claim 1, wherein said main body includes a support aperture configured to anchor a hook under tension by a fishing line.

10. The fishing tool according to claim 8, wherein said main body includes a support aperture configured to anchor a hook under tension by a fishing line, said eye being located on said head section and said support aperture being located on said tail section.

11. The fishing tool according to claim 1, wherein said main body includes a front lip having a terminal end which is normally in contact with said head section and is separable therefrom during movement of said head section to permit fishing line to be slid into said mouth and then into said throat for nipping or into said body cavity for cutting.

12. A fishing tool comprising:
a main body having a cutting blade and a nipping blade; said main body further comprising:
a tail section provided with a support formation engagable with a hook under tension by a fishing line;
a head section flexibly joined to said tail section by a flexible backbone;
a body cavity defined adjacent said backbone between said head section and said tail section, said cutting blade being located within said body cavity and having a fixed edge for cutting of fishing line extending through said body cavity;
a lower jaw defined on said main body which includes said nipping blade;
an upper jaw defined on said head section in spaced relation from said lower jaw to define an open throat in which said nipping blade is located for nipping by movement of said upper jaw of said head section toward said lower jaw;
said throat opening into a mouth into which fishing line may be slid for insertion into said throat for said nipping and opening into said body cavity in which said cutting blade is located for cutting of said fishing line by displacement of said fishing line against said cutting blade.

13. The fishing tool according to claim 12, wherein said cutting blade and said nipping blade are formed as a single blade, said main body including a slot and said single blade is fixed in said slot to position said cutting blade in said body cavity and position said nipping blade in said throat.

14. The fishing tool according to claim 12, wherein said main body includes connector blocks for removably mounting said fishing tool on a fishing rod, said connector blocks projecting sidewardly and engaging opposite ends of a connector strap to secure said fishing tool on a fishing rod.

15. The fishing tool according to claim 14, wherein said connector blocks include respective grooves which receive looped ends of the connector strap, said connector strap being formed as an O-ring and said main body including connector blocks to secure one or more said O-rings.

16. The fishing tool according to claim 12, wherein said head section includes an eye configured to support a hook without manual support.

17. The fishing tool according to claim 16, wherein said tail section includes a support aperture configured to anchor a hook under tension by a fishing line.

18. The fishing tool according to claim 12, wherein said tail section includes a support aperture configured to anchor a hook under tension by a fishing line, said main body including a projecting rib on said tail section adjacent said support aperture to rigidify a wall of said aperture when tensioned by said hook and said fishing line.

19. The fishing tool according to claim 12, wherein said main body includes a front lip having a terminal end which is normally in contact with said head section and is separable therefrom during movement of said head section to permit fishing line to be slid into said mouth and then into said throat for nipping or into said body cavity for cutting.

20. The fishing tool according to claim 12, wherein said tail section includes a projecting rib and said backbone spans a width of said main body to maintain alignment of said upper jaw and said nipping blade of said lower jaw during flexing of said backbone.

\* \* \* \* \*